United States Patent [19]

Nilsson

[11] Patent Number: 4,658,506
[45] Date of Patent: Apr. 21, 1987

[54] DEVICE IN CLEARING SAWS

[75] Inventor: Göran A. Nilsson, Sandarne, Sweden

[73] Assignee: Electrolux Motor AB, Sweden

[21] Appl. No.: 744,276

[22] Filed: Jun. 13, 1985

[30] Foreign Application Priority Data

Jun. 25, 1984 [SE] Sweden ................................. 8403373

[51] Int. Cl.⁴ ............................................. B27B 9/00
[52] U.S. Cl. ..................................... 30/371; 30/296 R
[58] Field of Search ...................... 30/122, 296 R, 390, 30/391, 371

[56] References Cited

U.S. PATENT DOCUMENTS

| | | | |
|---|---|---|---|
| 673,105 | 4/1901 | Young | 30/371 |
| 1,382,350 | 6/1921 | Gleason | 30/371 |
| 1,579,783 | 4/1926 | Ross | 30/296 R |
| 1,738,896 | 12/1929 | Hansen | 30/391 |
| 2,274,421 | 2/1942 | Lindstrom | 30/371 |
| 2,342,052 | 2/1944 | Jimerson | 30/371 X |
| 2,490,255 | 12/1949 | Chase | 30/371 |
| 2,520,411 | 8/1950 | Jenkins | 30/371 |
| 2,691,392 | 10/1954 | Jacobs | 30/390 X |
| 3,029,511 | 4/1962 | Masterson | 30/371 |
| 3,513,888 | 5/1970 | Townsend | 30/390 X |
| 3,931,676 | 1/1976 | Merle | 30/371 |
| 4,364,435 | 12/1982 | Tuggle | 30/296 R |

Primary Examiner—Jimmy C. Peters
Attorney, Agent, or Firm—Larson and Taylor

[57] ABSTRACT

A clearing saw comprises a circular saw blade which is rotatable relative to a portable frame and whose periphery is at least partly exposed to permit sawing and cutting through a tree-trunk. With the frame of the saw there is associated at least one arm which is pivotal on a joint and provided at its free end with an abutment member located outside the periphery of the saw blade and adapted, when desired, to be applied against another tree-trunk adjacent the trunk to be cut, in order during cutting of the first trunk to positively maintain the saw blade at a distance from said other trunk.

8 Claims, 6 Drawing Figures

DEVICE IN CLEARING SAWS

TECHNICAL FIELD OF THE INVENTION

The present invention relates to a device in clearing saws of the type comprising saw means, especially a circular saw blade, which is movable in relation to a portable frame and whose periphery is at least partly exposed or capable of being exposed to permit sawing or cutting through a tree-trunk.

BACKGROUND OF THE INVENTION

When setting out tree plants in clearings, two plants are always placed adjacent each other because one of the plants usually dies while the other will be growing up. However, it sometimes happens that both plants survive. In such a case, one of the two young trees must be cleared away in order that one fully grown tree should finally be allowed to develop under biologically optimal conditions.

Clearing young trees growing close together however is a great problem when using conventional clearing saws since the saw blade will too easily come into contact not only with the tree to be cut but also with the tree to be left, which means for instance that irreparable damage is done to both the bark and trunk of the last-mentioned tree.

BRIEF DESCRIPTION OF THE INVENTIVE CONCEPT

The present invention aims at providing a device which in an absolutely reliable and very simple manner ensures that the saw blade does not risk to come into contact with and damage the tree to be left. According to the principle of the invention, this is achieved in that there is associated with the frame of the saw at least one arm which is pivotal by means of a joint and provided, at a distance from the joint, with an abutment member located outside the periphery of the saw means or saw blade and adapted, when desired, to be applied against another tree-trunk located adjacent the trunk to be cut, in order during cutting of the first trunk to positively maintain said saw means or saw blade spaced from said other trunk as long as the abutment member is applied thereto.

BRIEF DESCRIPTION OF THE ACCOMPANYING DRAWINGS

DETAILED DESCRIPTION OF A PREFFERED EMBODIMENT OF THE INVENTION

Figure 1:
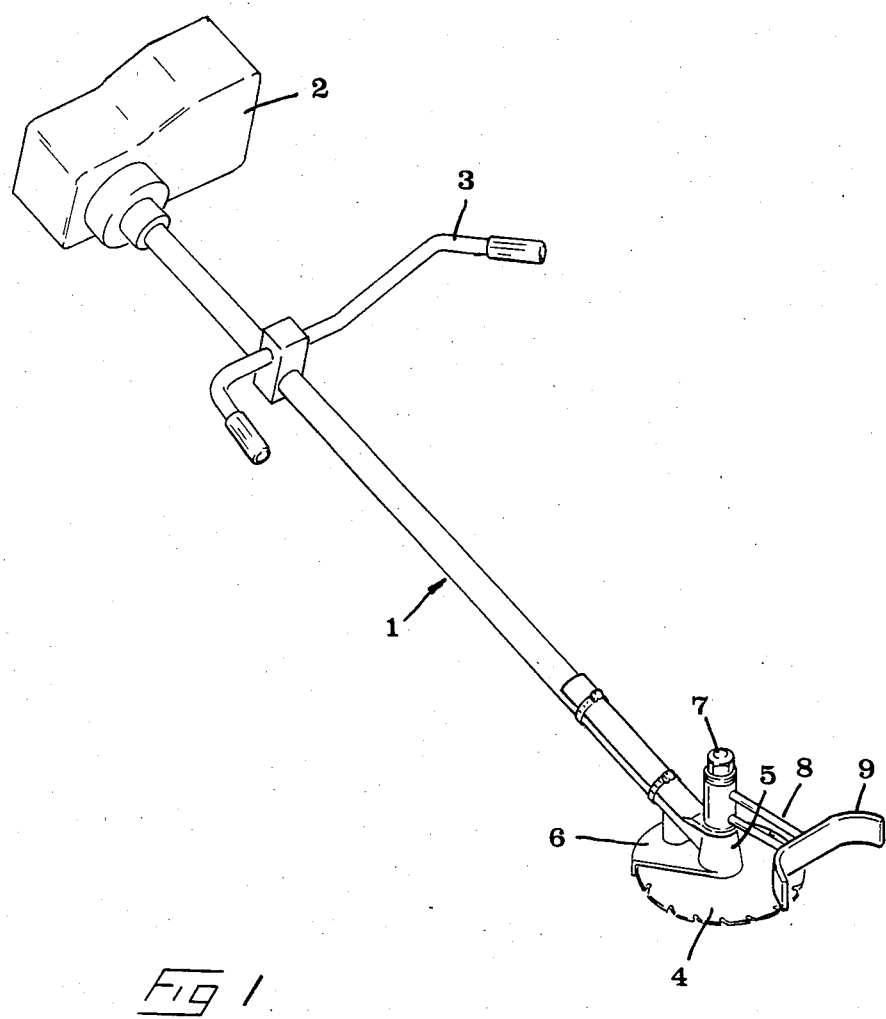
FIG. 1 is a perspective view showing a clearing saw assembly equipped with the device according to the invention.

FIG. 1 shows a clearing saw comprising a frame generally designated 1 which is in the form of a tube which is provided at one end with a motor 2 and a handle or grip 3. At the opposite end of the tube, there is provided a rotatable circular saw blade 4 which is mounted in a housing 5 extending at an angle to the tube 1. In a rearward direction away from the housing 5, there extends a sector-shaped guard plate 6 covering about ¼ of the circumference of the saw blade, while the remaining ¾ of the circumference thereof is exposed such that the saw blade can saw through thin or medium-thick tree-trunks.

Figure 4:
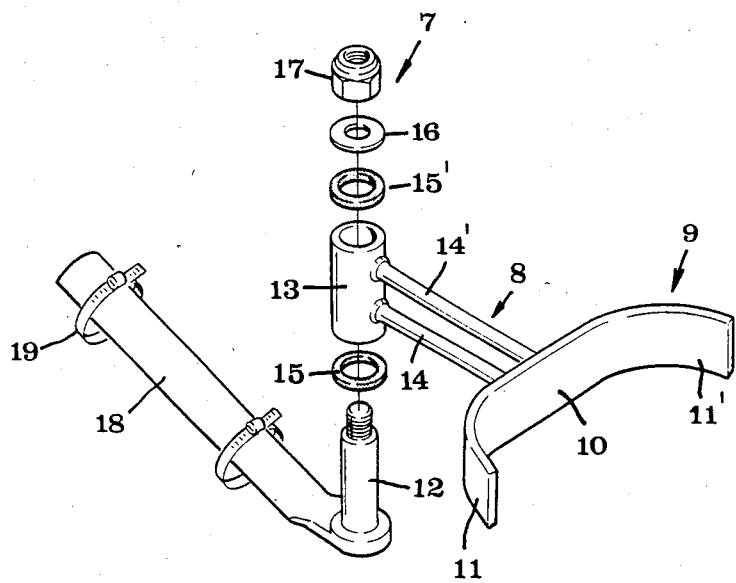
FIG. 4 is an exploded view illustrating the different components of the device.

According to the principle of the invention, there is associated with the frame 1 of the saw an arm 8 which is pivotal by means of a joint 7 and provided, at a distance from the joint, with an abutment member 9. In the illustrated Example, the abutment member is in the form of a flat iron having a central, planar portion 10 and two arcuate end portions 11, 11' (also see FIG. 4), this giving the abutment member a shape which is concave or widening in an outward direction away from the saw blade. As appears from FIG. 4, the joint generally designated 7 comprises an upright pin 12 on which there is placed a sleeve 13 connected to the abutment plate 9 by means of two tubes or rods 14, 14' together forming the arm 8. It should be noted that the joint 7 in this case is located at the center of rotation of the saw blade 4, the length of the arm 8 being but slightly greater than the radius of the saw blade, whereby the abutment plate 9 will be located immediately outside the serrated periphery of the saw blade.

In addition to the pin 12 and the sleeve 13, the joint 7 also comprises two friction washers 15, 15' for instance washers of plastic of a high friction coefficient, which are adapted to engage opposite ends of the sleeve 13. The joint further comprises a locking washer 16 and a locking nut 17. By the presence of the friction washers 15, 15', the arm 8 will be automatically maintained in a given angular position of rotation relative to the frame as long as the arm is in the unactuated state, the arm being pivotal in relation to the frame only after actuation thereof by at least a certain manual force. In other words, the abutment member 9 cannot move in an uncontrolled manner along the periphery of the saw blade when the abutment member is not being used, which is mostly the case.

In the illustrated embodiment, the joint 7 with the associated arm and the abutment member is mounted on an attachment 18 in the form of a plate of semi-circular cross-section which in a suitable manner, for instance by means of clamps 19, can be mounted on an existing clearing saw. It is however self-evident that the device according to the invention can also be provided directly in the bearing housing 5 in connection with the manufacture of a new clearing saw.

MODE OF OPERATION OF THE DEVICE ACCORDING TO THE INVENTION

Figure 2:
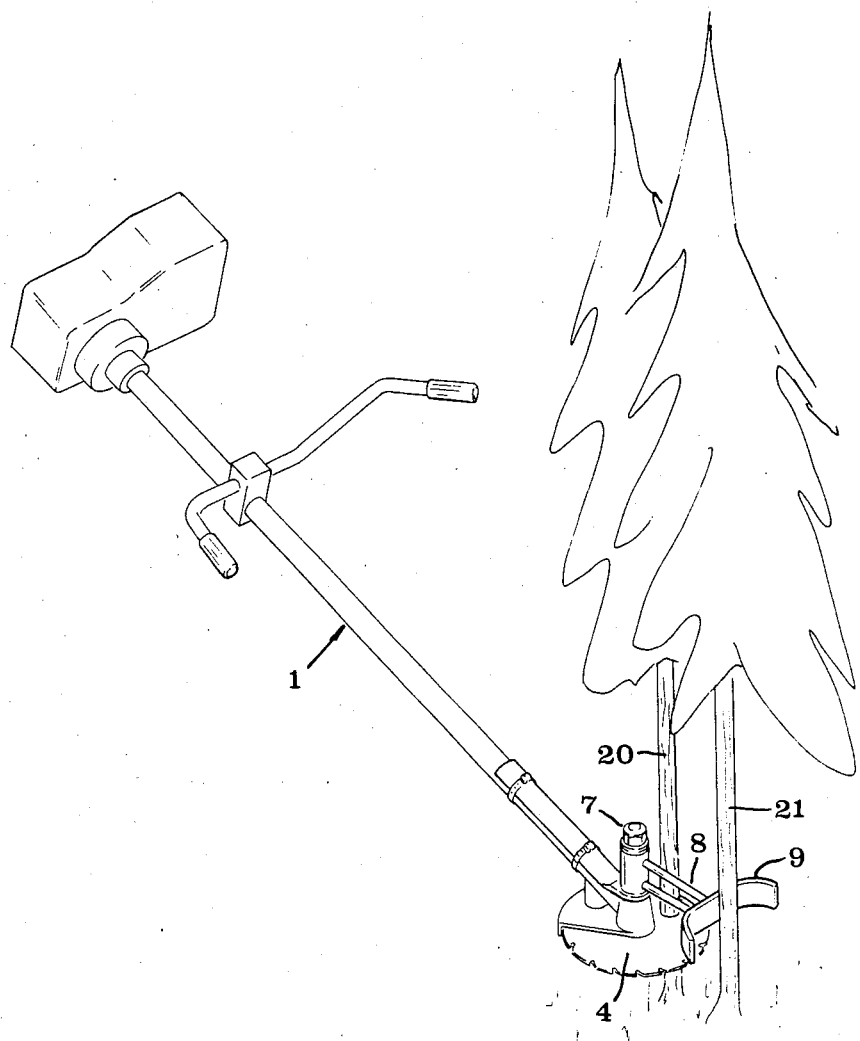
FIG. 2 is a perspective view illustrating the use of the clearing saw when cutting one of two young trees growing adjacent each other.
Figure 3:
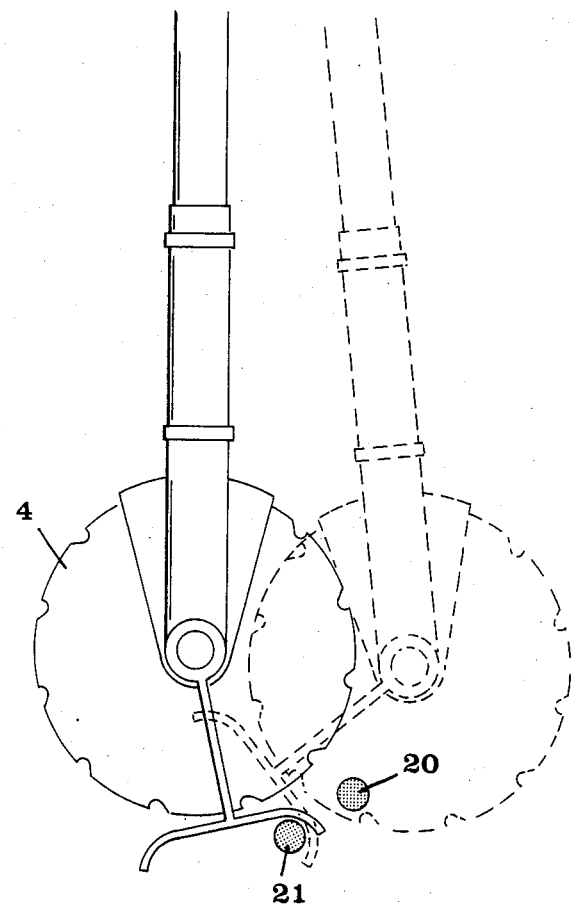
FIG. 3 is a partial top plan view illustrating the operation of the device according to the invention.

In the normal use of the saw, i.e. for cutting single tree-trunks standing alone, the abutment member 9 may be swung back to an inoperative position in the region of the guard plate 6. As soon as the operator encounters two trees 20, 21, as shown in FIGS. 2 and 3, growing close together, the abutment member 9 is passed in between the trunks of the two trees and applied against the trunk 21 to be saved, whereupon the saw blade 4, by means of the grip 3, is moved in an arcuate path about the trunk 21 during cutting of the trunk 20 of the tree to be cleared away. During such an arcuate movement, the saw blade will be positively held at a certain minimum distance from the trunk 21 in that the joint 7 and, hence, the center of the saw blade will describe a circular path of movement the radius of which is determined by the length of the rigid arm 8. In other words, one of the trees can be readily cut without any risk of the rotating saw blade coming into contact with and damaging the other tree.

CONCEIVABLE MODIFICATIONS OF THE INVENTION

Naturally, the invention is not restricted solely to the embodiment described above and illustrated in the drawings. Thus, the inventive concept is also applicable to saws having other types of saw means than a circular saw blade. For instance, the saw means may consist of an endless chain which is caused in a suitable manner to rotate along a suitable path of movement, for instance a circular or substantially triangular path. Also, it is possible to use saw means performing a reciprocating movement similar to that of a conventional saw blade. Further, it should be pointed out that other means than friction washers can be used for retaining the abutment member, as desired, in a given angular position in relation to the frame when the abutment member is not actuated by a manual force. Thus, the friction washers may be replaced by one or more springs which automatically return the abutment member to a given starting position when the abutment member is not used. Finally, it should be pointed out that the saw blade or saw means used may also be at least partly covered by one or more additional guard plates which can be removed in connection with the cutting operation.

Figure 5:
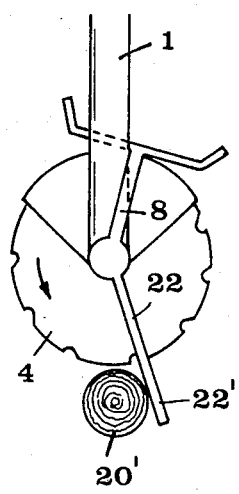
FIGS. 5-6 are views illustrating an alternative embodiment of the device.
Figure 6:
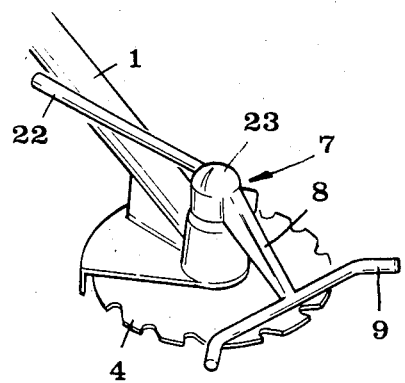

FIGS. 5 and 6 illustrate an alternative embodiment in which the arm 8 provided with the abutment member 9 is mounted on a hub-like member 23 which is part of the joint 7 and on which there is mounted a second arm 22 serving as a kick-back protection. The two arms extend at an obtuse angle with respect to each other, for instance 130°-160°. Thus, when the arm 8 is swung back to a resting position engaging the frame tube 1, as illustrated in FIG. 5, the arm 22 will make a certain, small angle (e.g. 15°-25°) with the longitudinal axis of the frame tube and project a substantial distance from the periphery of the saw blade 4. In the cutting of a single trunk 20', the saw can be moved straight against the trunk and pressed against it, whereby the projecting portion 22' of the arm will abut against the trunk. When the saw blade 4, rotating counter-clockwise in FIG. 5, thereafter comes into contact with the trunk, this will be abutting against the arm portion 22' in a reliable manner in that the arm 8 is arrested by its engagement with the frame tube 1. In other words, the arm 22 makes an efficient protection against kick-back of the saw as the saw blade engages the trunk.

It should be noted that the arm 8 extends obliquely downwards from the hub member 23 in order, when in a position of rest, to abut against the frame tube 1, while the arm 22 extends obliquely upwards, suitably parallel to the frame tube, so that it always gets clear of the frame tube.

What I claim and desire to secure by Letters Patent is:

1. A device for use with a clearing saw of the type having a rotatable circular saw means mounted on a portable frame and the periphery of which saw means is at least partially exposed or capable of being exposed to permit sawing and cutting through a first tree trunk, said device comprising at least one arm mounted on the frame at a joint for pivotal movement about a pivot axis of the joint, an abutment member connected to the arm and extending generally transverse to a radius from the axis of rotation of the saw means, said abutment member located outwardly beyond the periphery of the saw means, the said transverse extent of said abutment member being an at least partly arcuate plate which is concave and widens outwards away from the arm and thus comprising a means for positively holding the saw means spaced from a second tree trunk which is closely adjacent the said first tree trunk, as the saw means cuts through the first tree trunk on one side or the other of said arm and abutment member.

2. Device as claimed in claim 1, wherein the joint is disposed in the area of the center of the saw means and the arm extends radially out from the joint to the area immediately outside the periphery of the saw blade, the abutment member being provided on the free end of the arm spaced from said joint.

3. Device as claimed in claim 1, wherein the device comprises maintaining means for automatically maintaining the arm in a given angular position of rotation in relation to the frame as long as the arm is in a resting state, the arm being pivotal in relation to the frame only after actuation thereof by at least a certain manual force.

4. Device as claimed in claim 3, wherein said maintaining means comprise at least one friction washer included in said joint and acting between the frame and the movable arm.

5. Device as claimed in claim 1, wherein the arm is mounted on an attachment which, in turn, is mountable on the frame of an existing clearing saw.

6. Device as claimed in claim 1, wherein the arm provided with said abutment member is associated with a second arm partly projecting from the periphery of the saw means in order, when said abutment member is in a resting position, to serve as a kick-back protection for the saw.

7. Device as claimed in claim 6, wherein said two arms extend at an obtuse angle, in the range of 130°-160°, to each other, said second arm serving as a stop applicable to the frame and maintaining the kick-back protection arm in a given, fixed position in relation to the frame.

8. Device as claimed in claim 6, wherein said two arms are connected to and project from a common, suitably hub-shaped member included in said joint.

* * * * *